United States Patent
Martin et al.

(10) Patent No.: US 9,107,354 B2
(45) Date of Patent: Aug. 18, 2015

(54) REMOTE ANALYSIS AND CORRECTION OF CROP CONDITION

(75) Inventors: Tommy J. Martin, Lubbock, TX (US); Jeffrey P. McNeill, Lubbock, TX (US); Joel Hohenberger, Lubbock, TX (US)

(73) Assignee: SMARTFIELD, INC., Lubbock, TX (US)

( * ) Notice: Subject to any disclaimer, the term of this patent is extended or adjusted under 35 U.S.C. 154(b) by 863 days.

(21) Appl. No.: 13/263,044

(22) PCT Filed: Apr. 5, 2010

(86) PCT No.: PCT/US2010/029947
§ 371 (c)(1),
(2), (4) Date: Jan. 19, 2012

(87) PCT Pub. No.: WO2010/117944
PCT Pub. Date: Oct. 14, 2010

(65) Prior Publication Data
US 2012/0109387 A1    May 3, 2012

Related U.S. Application Data

(60) Provisional application No. 61/166,819, filed on Apr. 6, 2009, provisional application No. 61/166,828, filed on Apr. 6, 2009.

(51) Int. Cl.
*A01G 25/16* (2006.01)
*G05B 19/042* (2006.01)

(52) U.S. Cl.
CPC ............ *A01G 25/167* (2013.01); *G05B 19/042* (2013.01); *G05B 2219/2625* (2013.01)

(58) Field of Classification Search
None
See application file for complete search history.

(56) References Cited

U.S. PATENT DOCUMENTS

| | | | | |
|---|---|---|---|---|
| 4,015,366 A | * | 4/1977 | Hall, III | 47/1.43 |
| 4,209,131 A | | 6/1980 | Barash et al. | |
| 4,755,942 A | * | 7/1988 | Gardner et al. | 700/284 |
| 4,876,647 A | * | 10/1989 | Gardner et al. | 700/284 |
| 4,992,942 A | * | 2/1991 | Bauerle et al. | 700/284 |
| 5,479,339 A | | 12/1995 | Miller et al. | |
| 5,539,637 A | | 7/1996 | Upchurch et al. | |
| 5,601,236 A | * | 2/1997 | Wold | 239/63 |
| 6,236,907 B1 | * | 5/2001 | Hauwiller et al. | 700/283 |

(Continued)

FOREIGN PATENT DOCUMENTS

| | | |
|---|---|---|
| EP | 1570728 | 9/2005 |
| EP | 2417548 | 2/2012 |

(Continued)

OTHER PUBLICATIONS

M. Bahat et al., A fuzzy irrigation controller system, Engineering Applications of Artificial Intelligence, vol. 13, pp. 137-145, 2000.*

(Continued)

*Primary Examiner* — Darrin Dunn
*Assistant Examiner* — Christopher E Everett
(74) *Attorney, Agent, or Firm* — Jondle & Associates, P.C.

(57) ABSTRACT

A method, system and apparatus for early diagnosis and real time remote intervention of crop condition by correlating collected crop characteristics with known plant parameters, economic variables and algorithms to computer generate an irrigation decision, remotely execute the same and notify the end user.

27 Claims, 3 Drawing Sheets

(56) References Cited

U.S. PATENT DOCUMENTS

| | | | |
|---|---|---|---|
| 6,452,499 B1 | 9/2002 | Runge et al. | |
| 6,597,991 B1 | 7/2003 | Meron et al. | |
| 6,999,877 B1* | 2/2006 | Dyer et al. | 702/5 |
| 7,133,800 B2 | 11/2006 | Delin et al. | |
| 7,184,892 B1* | 2/2007 | Dyer et al. | 702/5 |
| 7,280,892 B2* | 10/2007 | Bavel | 700/284 |
| 7,532,954 B2* | 5/2009 | Evelyn-Veere | 700/284 |
| 7,660,698 B1* | 2/2010 | Seelig et al. | 702/170 |
| 7,742,862 B2* | 6/2010 | Anderson et al. | 701/50 |
| 7,752,106 B1* | 7/2010 | Corby et al. | 705/35 |
| 7,805,221 B2* | 9/2010 | Nickerson | 700/284 |
| 7,809,475 B2* | 10/2010 | Kaprielian | 700/284 |
| 7,844,517 B2* | 11/2010 | Willen et al. | 705/35 |
| 7,937,187 B2* | 5/2011 | Kaprielian | 700/284 |
| 8,170,721 B2* | 5/2012 | Nickerson | 700/282 |
| 8,200,368 B2* | 6/2012 | Nickerson et al. | 700/284 |
| 8,301,309 B1* | 10/2012 | Woytoxitz et al. | 700/284 |
| 8,457,799 B2* | 6/2013 | Cox | 700/284 |
| 8,649,907 B2* | 2/2014 | Ersavas | 700/275 |
| 8,649,910 B2* | 2/2014 | Nickerson et al. | 700/284 |
| 2002/0170229 A1* | 11/2002 | Ton et al. | 47/1.7 |
| 2003/0182022 A1* | 9/2003 | Addink et al. | 700/284 |
| 2004/0039489 A1* | 2/2004 | Moore et al. | 700/284 |
| 2004/0100394 A1* | 5/2004 | Hitt | 340/870.11 |
| 2005/0072862 A1* | 4/2005 | Skinner | 239/542 |
| 2006/0027677 A1* | 2/2006 | Abts | 239/67 |
| 2006/0030990 A1* | 2/2006 | Anderson et al. | 701/50 |
| 2006/0096174 A1* | 5/2006 | Haupt | 47/79 |
| 2006/0161309 A1* | 7/2006 | Moore et al. | 700/284 |
| 2007/0156318 A1* | 7/2007 | Anderson et al. | 701/50 |
| 2007/0255502 A1 | 11/2007 | Pruett et al. | |
| 2007/0260400 A1* | 11/2007 | Morag et al. | 702/1 |
| 2009/0099776 A1 | 4/2009 | Kapadi et al. | |
| 2009/0216594 A1 | 8/2009 | Verhey et al. | |
| 2010/0032495 A1 | 2/2010 | Abts | |
| 2010/0115830 A1* | 5/2010 | Dube | 47/17 |
| 2013/0318867 A1* | 12/2013 | Skinner | 47/1.7 |

FOREIGN PATENT DOCUMENTS

| | | |
|---|---|---|
| WO | WO 2009/048341 | 4/2009 |
| WO | WO 2010/117944 | 10/2010 |
| WO | WO 2012/065089 | 5/2012 |

OTHER PUBLICATIONS

U.S. Appl. No. 61/413,163, filed Nov. 12, 2010, Hohenberger et al.
Alchanatis V, Cohen Y, Cohen S, Moller M, Sprinstin M, Meron M, Tsipris J, Saranga Y, Sela E. 2010. Evaluation of different approaches for estimating and mapping crop water status in cotton with thermal imaging. Precision Agriculture 11(1):27-41.
Chaerle L, Leinonen I, Jones HG, Van Der Straeten D. 2007. Monitoring and screening plant populations with combined thermal and chlorophyll fluorescence imaging. J Exp Bot 58(4):773.
Chávez JL, Pierce FJ, Elliott TV, Evans RG, Kim Y, Iversen WM. 2010. A remote irrigation monitoring and control system (RIMCS) for continuous move systems. part B: Field testing and results. Precision Agriculture 11(1):11-26.
Chávez JL, Pierce FJ, Elliott TV, Evans RG. 2010. A remote irrigation monitoring and control system for continuous move systems. part A: Description and development. Precision Agriculture 11(1):1-10.
Cohen Y, Alchanatis V, Meron M, Saranga Y, Tsipris J. 2005. Estimation of leaf water potential by thermal imagery and spatial analysis. J Exp Bot 56(417):1843.
Conaty WC. 2011. Temperature-time thresholds for irrigation scheduling in drip and deficit furrow irrigated cotton Ph.D Thesis. The University of Sydney.
Falkenberg NR, Piccinni G, Cothren JT, Leskovar DI, Rush CM. 2007. Remote sensing of biotic and abiotic stress for irrigation management of cotton. Agric Water Manage 87(1):23-31.
Goense D, Thelen J, Langendoen K. 2005. Wireless sensor networks for precise *Phytophthora* decision support. Development 17:20.
Jones HG, Serraj R, Loveys BR, Xiong L, Wheaton A, Price AH. 2009. Thermal infrared imaging of crop canopies for the remote diagnosis and quantification of plant responses to water stress in the field. Functional Plant Biology 36(11):978-89.
Lee W, Alchanatis V, Yang C, Hirafuji M, Moshou D, Li C. 2010. Sensing technologies for precision specialty crop production. Comput Electron Agric . 74(1):2-33.
Mahan JR, Conaty W, Neilsen J, Payton P, Cox SB. 2010. Field performance in agricultural settings of a wireless temperature monitoring system based on a low-cost infrared sensor. Comput Electron Agric 71(2):176-81.
McCarthy A., Hancock N. and Raine S. R. 2009. Exploration of data requirements for adaptive control of irrigation scheduling. Proceedings of the 2009 CIGR international symposium of the australian society for engineering in agriculture: Agricultural technologies in a changing climateInternational Commission of Agricultural and Biosystems Engineering (CIGR).
Möller M, Alchanatis V, Cohen Y, Meron M, Tsipris J, Naor A, Ostrovsky V, Sprintsin M, Cohen S. 2007. Use of thermal and visible imagery for estimating crop water status of irrigated grapevine. J Exp Bot 58(4):827.
O'Shaughnessy S. 2007. Wireless makes sense in agriculture, USDA-ARS.
O'Shaughnessy SA and Evett SR. 2008. Integration of wireless sensor networks into moving irrigation systems for automatic irrigation scheduling. Proceedings of the American Society of Agricultural and Biological Engineers International (ASABE).Jun. 2008.
O'Shaughnessy S and Evett S. 2010. Developing wireless sensor networks for monitoring crop canopy temperature using a moving sprinkler system as a platform. Appl Eng Agric 26(2):331-41.
O'Shaughnessy S, Evett S, Colaizzi P, Howell T. 2011. Using radiation thermography and thermometry to evaluate crop water stress in soybean and cotton. Agric Water Management 98(10), 1523-1535.
Peters RT and Evett SR. 2008. Automation of a center pivot using the temperature-time-threshold method of irrigation scheduling. J Irrig Drain Eng 134:286.
Wanjura D, Upchurch D, Mahan J. 2004. Establishing differential irrigation levels using temperature-time thresholds. Appl Eng Agric 20(2):201-6.
Alderfasi AA and Nielsen DC. 2001. Use of crop water stress index for monitoring water status and scheduling irrigation in wheat. Agric Water Manage 47(1):69-75.
Baggio A. 2005. Wireless sensor networks in precision agriculture. ACM workshop on real-world wireless sensor networks (REALWSN 2005), stockholm, swedenCiteseer.
Bajwa S. G. and Vories E. D. 2006. Spectral response of cotton canopy to water stress. ASAE annual meeting, paper.
Bajwa SG and Vories ED. 2007. Spatial analysis of cotton (*Gossypium hirsutum* L.) canopy responses to irrigation in a moderately humid area. Irrig Sci 25(4):429-41.
Bastiaanssen WGM, Pelgrum H., Soppe RWO, Allen RG, Thoreson BP and de C. Teixeira AH. 2006. Thermal-infrared technology for local and regional scale irrigation analyses in horticultural systems. V international symposium on irrigation of horticultural crops 792. 33 p.
Beckwith R., Teibel D. and Bowen P. 2004. Report from the field: Results from an agricultural wireless sensor network. Local computer networks, 2004. 29th annual IEEE international conference onIEEE. 471 p.
Camilli A, Cugnasca CE, Saraiva AM, Hirakawa AR, Corrêa PLP. 2007. From wireless sensors to field mapping: Anatomy of an application for precision agriculture. Comput Electron Agric 58(1):25-36.
Clouse RW. 2006. Spatial Application of a Cotton Growth Model for Analysis of Site-Specific Irrigation in the Texas High Plains . Dissertation Abstracts International. vol. 68, No. 06, suppl. B, 168 p. 2006.
Colaizzi PD, Barnes EM, Clarke TR, Choi CY, Waller PM, Haberland J, Kostrzewski M. 2003. Water stress detection under high frequency sprinkler irrigation with water deficit index. J Irrig Drain Eng 129:36.
Damas M, Prados A, Gómez F, Olivares G. 2001. HidroBus system: Fieldbus for integrated management of extensive areas of irrigated land. Microprocessors and Microsystems 25(3):177-84.

(56) References Cited

OTHER PUBLICATIONS

Evans DE, Sadler EJ, Camp CR and Millen JA. 2000. Spatial canopy temperature measurements using center pivot mounted IRTs. Proc. 5th international conference on precision agriculture. 16 p.

Evans R, Iversen W, Kim Y. Integrated decision support, sensor networks and adaptive control for wireless site-specific sprinkler irrigation. American Society of Agricultural and Biological Engineers. 5th National Decennial Irrigation Conference Proceedings, Dec. 5-8, 2010, Phoenix Convention Center, Phoenix, Arizona USA IRR10-8492.

Evett S. R., Peters R. T. and Howell T. A. 2006. Controlling water use efficiency with irrigation automation: Cases from drip and center pivot irrigation of corn and soybean. Proc. 28th annual southern conservation systems conference. 26 p.

Evett SR, Howell TA, Schneider AD, Upchurch DR and Wanjura DF. 2000. Automatic drip irrigation of corn and soybean. Proc. 4th decennial national irrigation symposiumNov. 14 p.

Fuchs M. 1990. Infrared measurement of canopy temperature and detection of plant water stress. Theoretical and Applied Climatology 42(4):253-61.

Gardner B, Neilsen D, Shock C. 1992. Infrared thermometry and the crop water stress index. II: Sampling procedures and interpretation. J Prod Agric 5(4):466-75.

Gontia N and Tiwari K. 2008. Development of crop water stress index of wheat crop for scheduling irrigation using infrared thermometry. Agric Water Manage 95(10):1144-52.

Hashimoto A, Ito R, Nakanishi K, Mishima T, Hirozumi T, Kameoka T, Iguchi N, Hirafuji M, Ninomiya S. 2007. An integrated field monitoring system for sustainable and high-quality production of agricultural products based on BIX concept with field server. saint-w, pp. 76, 2007 International Symposium on Applications and the Internet Workshops (SAINTW'07).

Howell T, Hatfield J, Yamada H, Davis K. 1984. Evaluation of cotton canopy temperature to detect crop water stress. Trans ASAE 27(1):84-8.

Idso S, Jackson R, Pinter Jr P, Reginato R, Hatfield J. 1981. Normalizing the stress-degree-day parameter for environmental variability. Agricultural Meteorology 24:45-55.

Irmak S, Haman DZ, Bastug R. 2000. Determination of crop water stress index for irrigation timing and yield estimation of corn. Agron J 92(6):1221-7.

Kacira M, Ling P, Short T. 2002. Establishing crop water stress index (CWSI) threshold values for early, non-contact detection of plant water stress. Trans ASAE 45(3):775-80.

Kim Y, Evans RG, Iversen WM. 2008. Remote sensing and control of an irrigation system using a distributed wireless sensor network. Instrumentation and Measurement, IEEE Transactions on 57(7):1379-87.

Lea-Cox J. D., Kantor G., Anhalt J., Ristvey AG and Ross D. S. 2007. A wireless sensor network for the nursery and greenhouse industry. Proc. southern nursery assoc. res. conf. 454 p.

Liu H., Meng Z. and Cui S. 2007. A wireless sensor network prototype for environmental monitoring in greenhouses. Wireless communications, networking and mobile computing, 2007. WiCom 2007. international conference onIEEE. 2344 p.

Mahan J, McMichael B, Wanjura D. 1995. Methods for reducing the adverse effects of temperature stress on plants: A review. Environ Exp Bot 35(3):251-8.

Mahan JR, Young AW, Payton P. 2011. Deficit irrigation in a production setting: Canopy temperature as an adjunct to ET estimates. Irrig Sci :1-11.

Misra RK, Fuentes S. and Raine S. R. 2005. Recent developments and strategies in the use of plant indicators for irrigation scheduling. Restoring the balance, national conference of the irrigation association of australia. 17 p.

O'Shaughnessy SA and Evett SR. 2009. Using radiation thermometry to assess spatial variation of water stressed cotton. International Irrigation show :2-4.

O'Shaughnessy S and Evett S. 2010. Canopy temperature based system effectively schedules and controls center pivot irrigation of cotton. Agric Water Manage 97(9):1310-6.

O'Shaughnessy S. A., Evett S. R., Colaizzi P. D. and Howell T. A. 2010. Automatic irrigation scheduling of grain sorghum using a CWSI and time threshold. Irrigation association conference proceedings. 5 p.

O'Shaughnessy S. A., Hebel M. A. and Evett S. 2009. Developing a wireless infrared thermometer with a narrow field of view. Computers in agriculture international conference proceedings. 22 p.

O'Shaughnessy SA, Hebel MA, Evett SR, Colaizzi PD. 2011. Evaluation of a wireless infrared thermometer with a narrow field of view. Comput Electron Agric 76(1):59-68.

OECD 2009. Smart sensor networks: Technologies and applications for Green Growth. Report from the OECD, 2009. OECD code DSTI/ICCP/IE(2009)4/FINAL.

Ondimu S and Murase H. 2008. Water stress detection in sunagoke moss (*Rhacomitrium canescens*) using combined thermal infrared and visible light imaging techniques. Biosystems Engineering 100(1):4-13.

Peñuelas J, Save R, Marfà O, Serrano L. 1992. Remotely measured canopy temperature of greenhouse strawberries as indicator of water status and yield under mild and very mild water stress conditions. Agric for Meteorol 58(1-2):63-77.

Peters R and Evett S. 2005. Using low-cost GPS receivers for determining field position of mechanized irrigation systems. Appl Eng Agric 21(5):841.

Peters R and Evett S. 2007. Spatial and temporal analysis of crop conditions using multiple canopy temperature maps created with center-pivot-mounted infrared thermometers. Trans.ASABE 50(3):919-27.

Peters R. T. and Evett S. R. 2004. Complete center pivot automation using the temperature-time-threshold method of irrigation scheduling. Proc. ASAE/CSAE annual international meeting.

Peters R. T. and Evett SR. 2006. A fully automated center pivot using crop canopy temperature: Preliminary results. Proc. USCID water management conf. ground water and surface water under stress: Competition, interaction, solutions. 139 p.

Peters RT and Evett SR. 2004. Modeling diurnal canopy temperature dynamics using one-time-of-day measurements and a reference temperature curve. Agronomy J 96(1):1553-1561.

Pierce F and Elliott T. 2008. Regional and on-farm wireless sensor networks for agricultural systems in eastern washington. Comput Electron Agric 61(1):32-43.

Ruiz-Garcia L, Lunadei L, Barreiro P, Robla I. 2009. A review of wireless sensor technologies and applications in agriculture and food industry: State of the art and current trends. Sensors 9(6):4728-50.

Sadler E, Camp C, Evans D, Millen J. 2002. Corn canopy temperatures measured with a moving infrared thermometer array. Transactions—American Society of Agricultural Engineers 45(3):581-92.

Sullivan D, Fulton J, Shaw J, Bland G. 2007. Evaluating the sensitivity of an unmanned thermal infrared aerial system to detect water stress in a cotton canopy. Transactions of the ASABE 50(6):1955-62.

Thessler S, Kooistra L, Teye F, Huitu H, Bregt AK. 2011. Geosensors to support crop production: Current applications and user requirements. Sensors 11(7):6656-84.

Vellidis G, Tucker M, Perry C, Kvien C, Bednarz C. 2008. A real-time wireless smart sensor array for scheduling irrigation. Comput Electron Agric 61(1):44-50.

Wang D and Gartung J. 2010. Infrared canopy temperature of early-ripening peach trees under postharvest deficit irrigation. Agric Water Management 97(11), 1787-1794.

Wang N, Zhang N, Wang M. 2006. Wireless sensors in agriculture and food industry—recent development and future perspective. Comput Electron Agric 50(1):1-14.

Wanjura DF, Upchurch DR and Mahan JR. 1992. Canopy temperature controlled irrigation. International symposium on irrigation of horticultural crops 335. 477 p.

Yang Y, Ling P, Fleisher D, Timlin D, Reddy V. 2008. Non-contacting techniques for plant drought stress detection. Transactions of the ASABE 51(4):1483-92.

Yazar A, Howell T, Dusek D, Copeland K. 1999. Evaluation of crop water stress index for LEPA irrigated corn. Irrig Sci 18(4):171-80.

(56) References Cited

OTHER PUBLICATIONS

Yiming Z., Xianglong Y., Xishan G., Mingang Z. and Liren W. 2007. A design of greenhouse monitoring & control system based on ZigBee wireless sensor network. Wireless communications, networking and mobile computing, 2007. WiCom 2007. international conference onIEEE. 2563 p.

Burke J.J. and Oliver M.J. 1993. Optimal Thermal Environments for Plant Metabolic Processes (*Cucumis sativus* L.). Plant Physiol. 102: 295-302.

Ferguson D.L. and Burke J.J. 1991. Influence of Water and Temperature Stress on the Temperature Dependence of the Reappearance of Variable Fluorescence following Illumination. Plant Physiol. 97: 188-192.

Idso SB. 1982. Non-water-stressed baselines: A key to measuring and interpreting plant water stress* 1. Agricultural Meteorology 27(1-2):59-70.

Kacira M and Ling P. 2001. Design and development of an automated and non-contact sensing system for continuous monitoring of plant health and growth. Transactions—American Society of Agricultural Engineers 44(4):989-96.

Leinonen I and Jones HG. 2004. Combining thermal and visible imagery for estimating canopy temperature and identifying plant stress. J Exp Bot 55(401):1423.

Mahan JR, Burke JJ, Wanjura DF, Upchurch DR. 2005. Determination of temperature and time thresholds for BIOTIC irrigation of peanut on the southern high plains of texas. Irrig Sci 23(4):145-52.

McCarthy AC, Hancock NH, Raine SR. 2010. VARIwise: A general-purpose adaptive control simulation framework for spatially and temporally varied irrigation at sub-field scale. Comput Electron Agric 70(1):117-28.

Meron M, Tsipris J, Orlov V, Alchanatis V, Cohen Y. 2010. Crop water stress mapping for site-specific irrigation by thermal imagery and artificial reference surfaces. Precision Agriculture 11(2):148-62.

Wanjura D, Hatfield J, Upchurch D. 1990. Crop water stress index relationships with crop productivity. Irrig Sci 11(2):93-9.

Wanjura D, Upchurch D, Mahan J. 1995. Control of irrigation scheduling using temperature-time thresholds. Trans ASAE 38(2):403-9.

Hirafuji M, Yoichi H, Miki Y, Nesumi H, Hoshi N, Fukatsu T, Matsumoto K, Nastuhara K. 2010. Analysis of environment and physiological data of citrus orchards by using field server. AFITA 2010 International Conference, The Quality Information for Competitive Agricultural Based Production System and Commerce.

Howell TA and Meron M. 2007. 3. irrigation scheduling. Developments in Agricultural Engineering 13:61-130.

Moran M, Clarke T, Inoue Y, Vidal A. 1994. Estimating crop water deficit using the relation between surface-air temperature and spectral vegetation index. Remote Sens Environ 49(3):246-63.

Yoo S., Kim J., Kim T., Ahn S., Sung J. and Kim D. 2007. A2S: Automated agriculture system based on WSN. Consumer electronics, 2007. ISCE 2007. IEEE international symposium onIEEE. 5 pages.

\* cited by examiner

REMOTE ANALYSIS AND CORRECTION OF CROP CONDITION

CROSS REFERENCE TO RELATED APPLICATIONS

This application is the U.S. National Phase under 35 U.S.C. 371 of International Application PCT/US2010/029947, filed Apr. 5, 2010, and published in English, which claims priority to U.S. Provisional Application No. 61/166,819, filed Apr. 6, 2009 and U.S. Provisional Application No. 61/166,828, filed Apr. 6, 2009. The disclosure of each of the above-listed priority applications is incorporated herein by reference in its entirety.

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE INVENTION

1. Field of the Invention

The field of the invention is that of remote analysis and correction of crop condition, namely through a sophisticated system of data collection, computer analysis and remote irrigation response that includes status alerts to the end user. In the disclosed method and system, crop condition is remotely monitored and managed by collecting and analyzing multiple streams of data, including crop characteristics which may include biologic and environmental variables. The data is transmitted to a server where it is correlated with customized algorithms that may include economic variables in order to computer formulate an irrigation decision which is then executed manually or remotely by the end user or in an automated fashion by signal to the irrigation field base station.

2. Description of Related Art

In the United States, 80% of all fresh water consumed is for irrigation. Of that amount, 70% is used for agriculture. The United States uses nearly 83 trillion gallons of water annually to irrigate some 53 million acres. The majority (44%) of irrigated acreage utilizes gravity fed or "flooding" techniques. Center pivot irrigation commands an additional 41%. Drip irrigation is the slow application of water directly to the root area of the plant and is used 5% of the time. It provides a 95% to 99% applied water efficiency, much higher than either gravity fed or center pivot methods.

Even with drip irrigation, however, there remains a tendency to overwater. Using only visual or indirect means to analyze plant condition, the grower lacks sophisticated or timely enough data to accurately decide when to initiate or cease irrigation. Even if he were to make an educated guess as to the number of hours of watering his crop required, his estimated water need will fluctuate widely during the watering time, as a result of environmental variables such as rain, ambient temperature, relative humidity, wind speed and crop need.

In addition, growers are not always available to manually assess crop condition and start, stop, or adjust irrigation. Although limited technology exists to "remote start" irrigation systems, these technologies are cost prohibitive for most growers and limited in application. They lack data collection, data transmission, computerized correlation with algorithms, irrigation decision formulation and real time remote or automated execution. Although a few remote monitoring and irrigation systems exist, they are designed for residential or commercial sprinkler system use, rather than commercial agriculture. Even with a "remote start" system the grower must still physically visit his fields and make the subjective determination of whether it is prudent to water. This handicaps the grower's ability to build the business.

As an example of the limiting nature of current systems, if it rains during the night while the irrigation is running, the crops are likely overwatered by the time the grower wakes up and takes action. Even if the grower is sophisticated enough to use soil moisture sensors or other methods, he still must interpret the information, formulate a decision as to whether to irrigate and then be present to manually start and stop his system.

There are three methods of assessing a crop's condition: visual, indirect and direct. Visual observation is subjective at best and requires the grower to wait for physical signs of plant deterioration before adjusting the irrigation schedule. This waiting period causes the crop to experience significant and otherwise preventable stress. Methods of indirect measurement include soil moisture sensors, calculation of evapotranspiration or atmospheric parameters. These techniques require considerable time, cost and effort and still fail to give a comprehensive assessment of the plant's water needs. Direct measures such as measuring stomatal resistance exist but are costly and destructive to the plant. Studies increasingly reveal the value of calculating a crop water stress index (CWSI) and scheduling irrigation accordingly to minimize the plant's stress and optimize growth (or blooming or other characteristics desired by the grower). To calculate CWSI effectively though requires direct measurement of the plant's water status, preferably with real time reporting to ensure rapid response to the crop's earliest changes.

Upchurch et al., (U.S. Pat. No. 5,539,637, issued Jul. 23, 1996) developed a process for making irrigation decisions for crops based on crop canopy temperature measurements. Research has shown plants exhibit optimum enzyme function when their temperature stays within a specific thermal kinetic window. Burke et al. (1988, Agron. J., 80:553-556). Mahan and Upchurch later proposed that plants have a preferred temperature range and that maintenance of this temperature range requires the plant to have sufficient energy input to raise temperature, sufficient water to lower temperature, and a humidity range that allows for transpirational cooling. Mahan and Upchurch (1988, Envirn. and Exp. Botany, 28:351-357).

Based on these and similar studies, Upchurch et al developed a method for determining under what circumstances additional water would be effective to lower a plant's temperature to achieve the optimum thermal kinetic window. (U.S. Pat. No. 5,539,637, issued Jul. 23, 1996). In the Upchurch patent, only crop canopy temperature, air temperature and humidity are measured. These measurements are incorporated into formulas to determine the plant's level of thermal induced stress and what length of time the plant has been overstressed. The measurements are compared to predetermined optimal temperatures for the specific plant variety and, if warranted, an audible or visible signal is generated. The operator can review the data and signal and decide to manually begin irrigation. (U.S. Pat. No. 5,539,637, issued Jul. 23, 1996).

The Upchurch patent was a significant breakthrough due to its capability to directly, rather than indirectly, measure a plant's water needs without being invasive or destructive. Since the granting of the Upchurch patent, more types of biological data have become important to determine irrigation decisions. Although the Upchurch method of collecting canopy temperature, humidity and air temperature is still good science, a grower needs to be able to use other biological, environmental and even economic data to more specifically control crop growth and production, and, more importantly, to do so with minimal use of water.

There is also a need for the grower to access historical data of his crop water status and treatments. Farming has progressed to a highly technical science, where biological characteristics of the plant, environmental conditions, expected environmental forecasts and even such data as market changes, utility costs and water restriction laws must be considered to reach prudent watering decisions. It is highly time-consuming and burdensome for the grower to collect all these various types of data, timely correlate an irrigation schedule and then manually adjust his irrigation method as needed on a real time basis.

As the cost of fuel and electricity to pump water rises, the grower is incentivized to implement specific watering strategies. The water efficiency of systems such as drip irrigation could be vastly improved by incorporating more sophisticated methods to determine when and how much to water. There is a need for a system capable of cost effectively collecting and analyzing multiple sets of data to determine crop condition, long before visual signs of over or under watering manifest.

There is a need for sophisticated methods to determine crop condition and the crop's precise water needs. There is a need for a simple and cost effective means whereby the grower can monitor and control the performance of an irrigated crop from the convenience of his office or home. There is a need for an improved method and system to automate the process of determining when it is prudent to irrigate and executing that decision.

SUMMARY OF THE INVENTION

In accordance with the present invention, a method and system is disclosed which enables remote analysis and correction of a crop's water needs, through a real time self correcting and automated irrigation system that incorporates diagnostic technology.

The disclosed method and system poses several advantages. The first advantage is that crop condition is accurately pinpointed long before visual changes in the plant appear. The grower has the benefit of earlier and more accurate analysis of crop condition with no time lag from the onset of crop deterioration until intervention.

The second advantage is that the disclosed method and system allows the grower to respond to the plant's needs remotely or even by an automated method. The grower receives real time data as to the comprehensive physical condition and water needs of the plant and is able to respond instantly, whether the grower sends the control command himself or has the system programmed to automatically irrigate or shut off irrigation based on programmable criteria. The grower may also choose to override the automated response so that he may manually intervene.

The third advantage is that the grower does not have to physically visit his field to determine whether his crop is getting too much or too little water and to institute a response.

A fourth advantage is that the system ensures the irrigation water is far more precisely delivered in concert with the crop's needs, minimizing water waste which in turn saves money and conserves our precious water resources.

More particularly, the present invention is able to collect and analyze a wide variety of variables which may include biological characteristics of the plant (including leaf wetness, leaf thickness, stem diameter and canopy color), environmental conditions, expected environmental forecasts, market changes, utility costs and water restriction laws prior to calculating an irrigation decision.

These multiple streams of real time data are transmitted to a server and correlated with algorithms to formulate an irrigation decision which is then instantaneously and remotely executed.

Other advantages of the present invention will become apparent from the following descriptions, taken in connection with the accompanying figures, wherein, by way of illustration and example, an embodiment of the present invention is disclosed.

BRIEF DESCRIPTION OF THE DRAWINGS

The figures constitute a part of this specification and include exemplary embodiments to the invention, which may be embodied in various forms. It is to be understood that in some instances various aspects of the invention may be shown exaggerated or enlarged to facilitate an understanding of the invention. To enable more thorough understanding of the features and advantages of the present invention, reference is now made to the detailed description of the invention along with the accompanying figures in which.

The application makes no claim for the structure of the objects, if any, depicted in the photos and drawings, such as computers, and they are considered prior art. The drawings contained herein represent preferred embodiments of the invention and are not intended to limit the scope. For a detailed description of various embodiments, reference will now be made to the accompanying illustrative drawings in which:

DETAILED DESCRIPTION OF THE PREFERRED EMBODIMENTS

Figure 1:
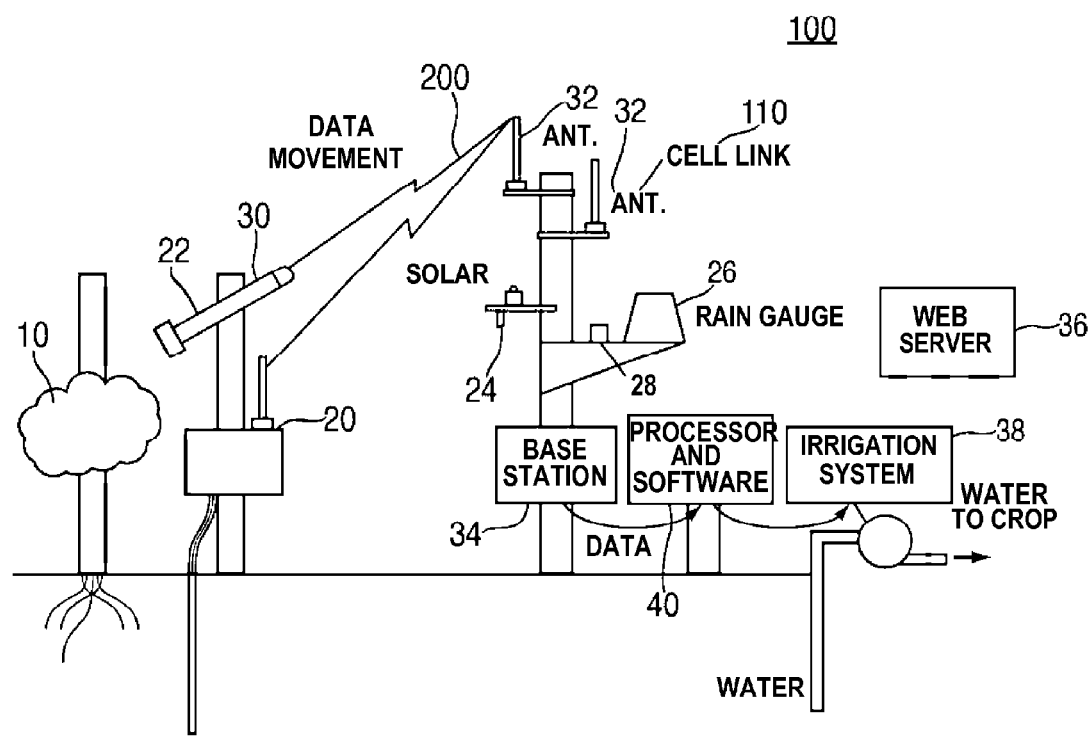
FIG. 1 is a schematic overview of the system in accordance with a preferred embodiment of the disclosed invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention.

Certain terms are used throughout the following description to refer to particular method components. As one skilled in the art will appreciate, design and manufacturing companies may refer to a component by different names. This document does not intend to distinguish between components that differ in name but not function.

In the following discussion, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "submethods" within the method.

The disclosed invention provides a relatively simple and inexpensive method and system for real time automatically and remotely assessing and evaluating crop condition and responding with an irrigation decision. The method incorporates wired and wireless transmission to collect and transmit the data. The end user benefits by receiving crop alerts and computerized irrigation decisions on the time interval of his choice. He may choose to execute control commands himself or just receive alerts that changes have been made by the field based controller.

A typical irrigation management scheme tends to rely on measuring parameters that do not always relate directly to the plant. Therefore, the methods tend to be open-loop in nature as they do not measure the plant directly. The development of infrared thermometers, plant leaf wetness sensors, leaf thickness sensors and dendrometers has given researchers and growers the opportunity to measure more objective and relevant plant characteristics, yet do so remotely by placing such sensors in the field and equipping them with radio chips or other means for data transmission back to a controller.

The disclosed method and system is able to correlate a wide array of variables with known plant parameters to determine exactly what a plant's water needs are.

As an example, the following characteristics can be collected and analyzed to reach the final irrigation decision.
Table 1. Crop Biological Characteristics

TABLE 1

| CROP BIOLOGICAL CHARACTERISTICS | | |
| --- | --- | --- |
| Canopy Color | Canopy temperature | Leaf wetness |
| Stem diameter | Leaf thickness | |

Table 2. Weather Characteristics

TABLE 2

| WEATHER CHARACTERISTICS | | | |
| --- | --- | --- | --- |
| Solar radiation | Humidity | Rainfall | Temperature |
| Barometric pressure | Wind speed | | |

Turning to the figures for illustration, in FIG. 1 is depicted a schematic overview of a preferred embodiment 100 of the method and system. Placed in the crop 10 at desired intervals are a variety of crop sensors which may include, as depicted, a soil moisture sensor 20, or a canopy temperature sensor 22. Also placed in the field, or hardwired to the field base station, are sensors to measure weather characteristics, which may include a solar radiation sensor 24, a rain gauge 26 and a barometric pressure gauge 28. The types of crop sensors used may vary according to the type of crop and the crop characteristics which the grower wishes to measure. Examples of other sensors that may be placed could include sensors or gauges to measure leaf thickness, leaf wetness, wind speed and direction or ambient temperature.

The sensors, for example the canopy temperature sensor 22, may be programmed to take readings on whatever schedule is desired by the grower. In the preferred embodiment, small, lightweight, inexpensive infrared sensors are used. Canopy temperature sensors 22, when used, are placed at a reasonable height to be able to measure the tops, or canopy, of the leaves, depending on the height of the plant. The sensors may be powered by batteries or solar power. The sensors used in the preferred embodiment have the capability to take readings as frequently as every five seconds. In the preferred embodiment the sensor takes a reading every sixty seconds and hibernates between readings to conserve battery life. The time interval can be changed with switch settings in the sensor electronics or by software changes. Using the sixty second interval, the batteries have been found to last eight to nine months.

The crop canopy temperature sensors 22 used in the experiments conducted by the inventors have a built in radio transceiver 30. The readings are transmitted via radio frequency 200 to an antenna 32 located on the field base station 34. At a specified time interval, the crop canopy temperature sensor 22 (or other type of sensor as described in paragraph [0039]) takes an average of its last several readings and transmits the average to the field base station 34. The field base station 34 can be a receiver (for one way transmission) or may be a transceiver (for two way transmission). In the preferred embodiment, the sensor 22 averages its readings every 15 minutes and transmitted the average.

In the preferred embodiment, the environmental crop characteristics such as relative humidity, rainfall and air temperature can be measured in the field by sensors or by pods that are hardwired to the field base station. Additional environmental data to assist with weather projections can also be collected and may include barometric pressure or other weather related readings.

Figure 2:
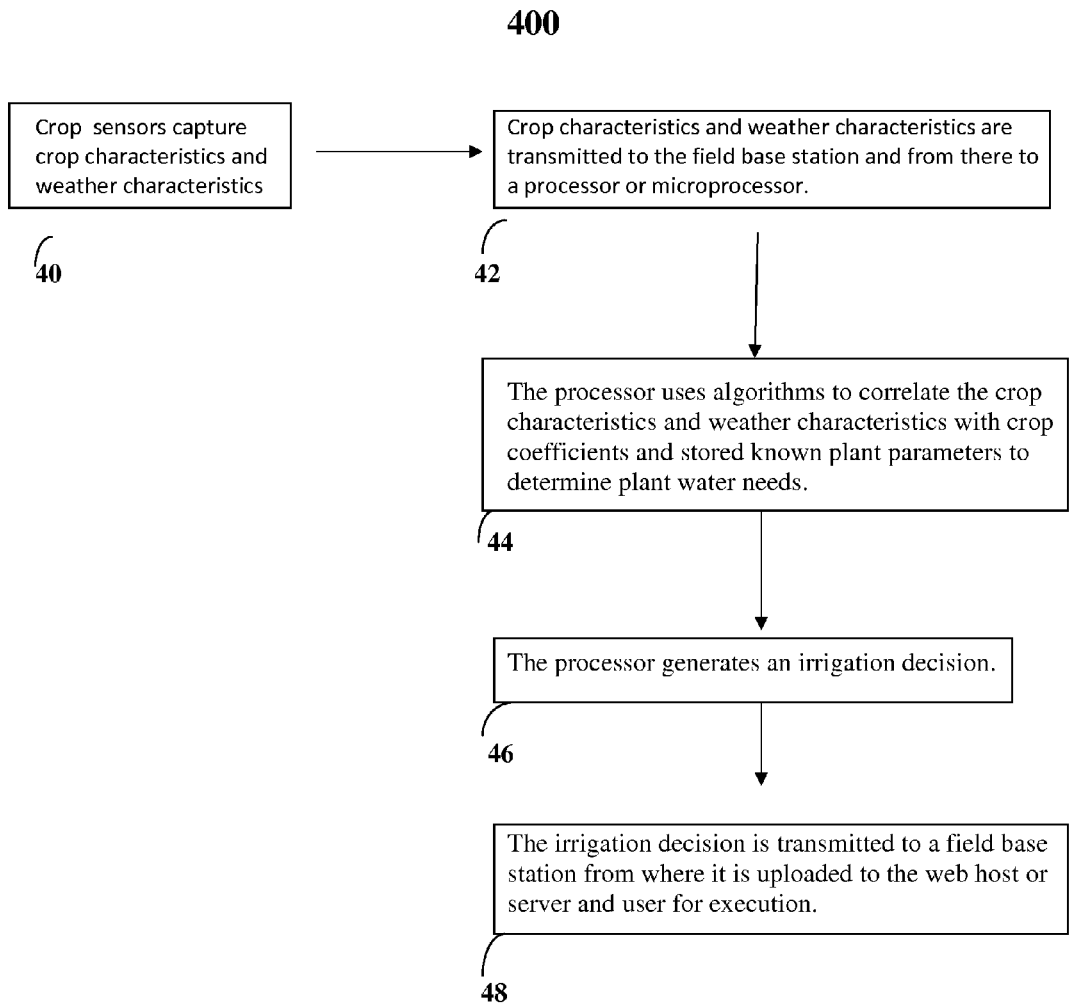
FIG. 2 is a flowchart of the method and system in accordance with a preferred embodiment of the disclosed invention.

FIG. 2 depicts a flowchart of a preferred embodiment 400 of the disclosed method and system. In the first step 40, the crop sensors capture the crop characteristics and weather characteristics, as earlier described. In the second step 42, the crop characteristics and weather characteristics are transmitted to the field base station and from there to a processor. In step three 44, the processor uses stored algorithms to correlate the crop characteristics and weather characteristics with crop coefficients and stored known plant parameters to determine plant water needs. In step four 46, the processor calculates and generates an irrigation decision. In step five 48, the irrigation decision is transmitted to the field base station 34 from where it is uploaded to the web host or server 36 and transmitted to the end user for execution. The irrigation decision may be manually, automatically or remotely executed.

Figure 3:
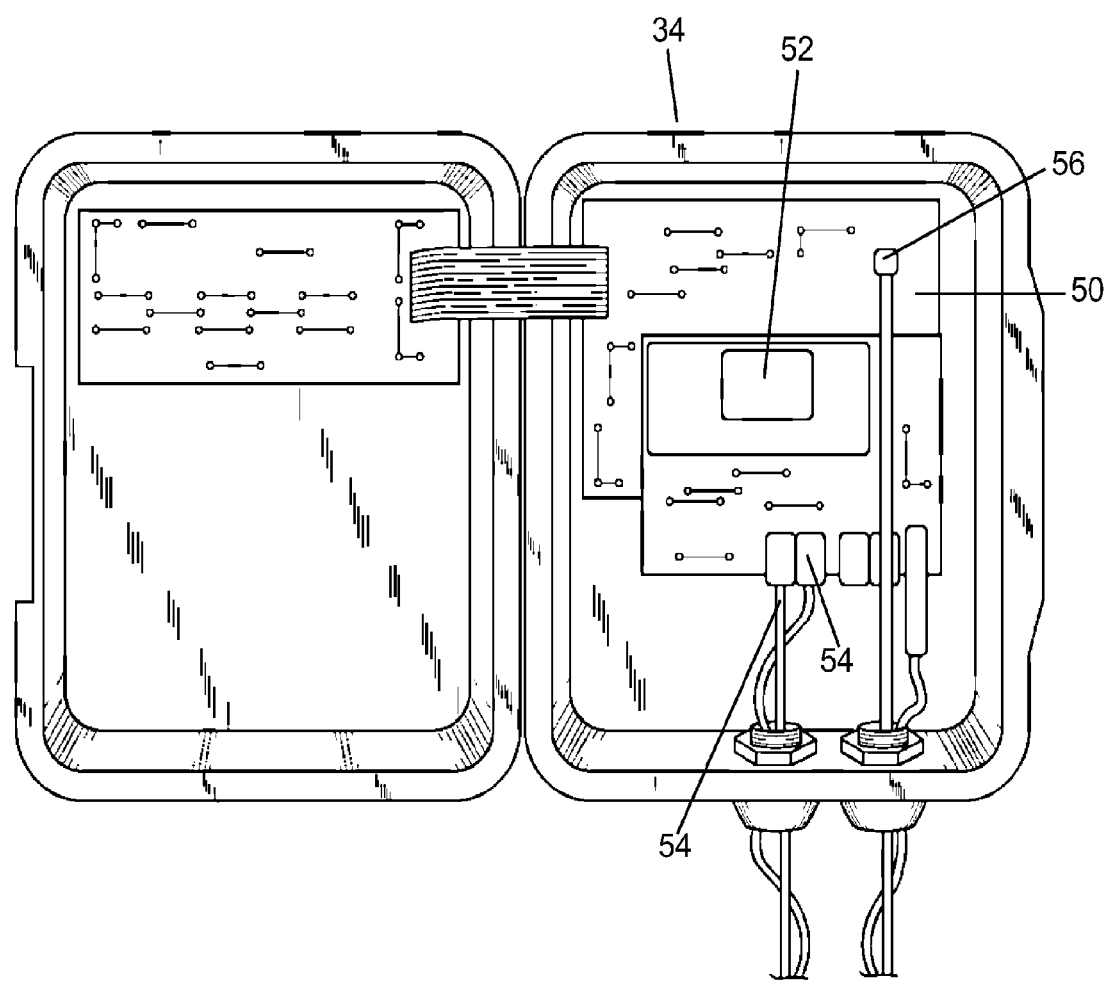
FIG. 3 is a front view of the inside of the field base station in accordance with a preferred embodiment of the disclosed invention.

As shown in FIG. 3, the field base station 34 contains a motherboard 50, a modem 52, a communications cable 56, and is programmed with a specific IP address. In a preferred embodiment, at various time intervals, for example every two hours, a remote central computer with a processor or microprocessor and a memory calls the modem 52 and uploads the collected data for storage and processing. The central computer can upload the data to a web host or server 36. The web server 36 can store the historical data, for reference by the grower. Hardwired into the bottom of the field base station are the weather characteristic sensors, for example the wiring 54 for the rain gauge 26 or others.

Since the field base station 34 has its own IP address, it can be contacted at any time remotely using an internet enabled device. For example, the grower could, from the comfort of his home, access the data in the field base station. The field base station 34 is also capable of a WiFi connection. Some users may wish to go out to the field at times and use a data cable to connect their cell phone, PDA or laptop directly to the field base station and access and store readings. The central computer may be programmed to post status alerts to the website, as well as transmit the message to the end user via cell phone text message, email or other known methods. The end user might receive a message such as the following: "Your crops are currently not in water stress. 0.52" of rainfall has been reported at the site. The method has issued a stop irrigation command. The irrigation is currently off. The method will advise when to resume irrigation."

As noted in the message above, the central computer can, simultaneously with the transmission of the message to the end user, also send a control command to the field base station. The field base station 34 is wired into the irrigation system control panel 38 and can initiate, stop or adjust irrigation schedules as indicated by the control command.

The grower is able to visit the web server 36 to view the historical data that was collected and used as the basis for the watering decision. He can analyze trends as desired. The grower can override any decision made by the computer algorithms by manually resetting his irrigation or control panel or choosing specific options on the website. The method could potentially be programmed to transmit any type of relevant irrigation information. For example, the grower may wish to incorporate data pertaining to soil moisture, soil nutrient content, pressure changes of the irrigation method, or other data that a grower would routinely check when visiting the field. If so programmed, sensors or pods would be placed in the field to relay such data to the field base station 34 for transmission to the central computer and upload to the web server 36. The grower can check comprehensive parameters and conditions of his crop from various remote locations and can simultaneously send control commands back to the field based controller.

The central computer is programmed with software containing known plant parameters for biologic characteristics that would be useful in determining whether the plant is stressed. The computer is also programmed with various known algorithms to calculate plant water needs based on the plant species and stage of growth. The data is correlated with the algorithms to reach watering decisions using a software program such as SmartDrip™ 40.

As an example, one algorithm developed by the inventors is as follows:

Irrigation decision(<0=NO:>0=YES)=$a$(Plant stress time)+$b$(Canopy temp−optimum temp)+$c$(sensor input)+$d$(soil moisture content)+$e$(cost of water)+$f$(crop price)+$g$(water remaining)+$h$(predicted future high temps)+$i$(desired yield percentage)+$j$(desire margin percentage)+$k$(cost of energy)

The crop coefficients "a" through "k" listed above are specific to crop, growing location, and soil conditions which can be input by the user.

Market conditions and weather forecasts may be crop coefficients as well. To determine whether or not to irrigate is a complicated matter made up of numerous inputs. This equation deals with those inputs by creating a factoring of all inputs to determine a YES or NO irrigation decision. The period of this determination can be varied depending on the physical limitations of the irrigation system. The equation compiles information about the health of the crop, the water status in the soil and the economics of the irrigation decision in regards to input.

The end user may enter data pertaining to the plant's life stage or other variables to assist the computer with its decision. In the preferred embodiment, the application will employ multiple streams of data, including the factors of average stress time for the previous day, or some number of days, measurements regarding the output of the irrigation systems, both time and volume, and predictive factors based on expected weather data, such as forecasted high temperature for the upcoming day, or days to reach its irrigation decision. The computer software generates an irrigation decision to stop, start or adjust irrigation based on the data, algorithms and predetermined parameters.

In a preferred embodiment, the apparatus will employ three modes of operation: Timer mode, Hybrid mode and Automatic Mode. In the Timer Mode, the operator can turn irrigation system ON or OFF based on a typical schedule controller. This option can have remote control via Internet connection, but it does not take any input from biological sensors and considers time only control. This mode would be similar to a typical irrigation controller although the currently known controllers lack the remote access via Internet connection disclosed herein.

In the Automatic Mode the apparatus will use biological and environmental information supplied by Smartfield™ systems (SmartCrop™, SmartWeather™, SmartProfile™ 3X, Sensor Station and others) to schedule irrigation automatically based on the plant's needs and the measured environmental variables, such as ambient temperature or solar radiation. In the automatic mode, each irrigation zone would be activated to run for a period of time calculated off a crop metric (for example the amount of time that the canopy temperature was above the biological optimum for that particular crop). This metric is used in an algorithm to translate the metric into a reasonable time period as shown below. Because the metric is based on the plant canopy temperature, any control logic is self-correcting in that if too little water is applied during the Automatic Mode, the subsequent measurement of time of canopy temperature above biological optimum will be a greater number, which will increase the amount of irrigation time for the next period.

In the Hybrid Mode, the apparatus splits an irrigation interval (for example 24 hours) into two periods. One period would be a Timer Mode and the other period would be Automatic Mode.

Irrigation Timing Algorithms:

Automatic Irrigation Time per zone ($T_{AI(1)}$):
$T_{AI(1)}$=Stress Time*Irrigation Factor Given a Stress Time of 210 minutes for zone 1 and an Irrigation Factor of 3.33;

$T_{AI(1)}$=63 minutes

An additional logical algorithm can be added to automatically adjust the Irrigation Factor to make it self-correcting such that irrigation times that continue to increase while daily high temperatures are not increasing suggests that the irrigation times are set too low. Likewise, if irrigation times are decreasing while daily high temperatures are increasing suggests that irrigation times are set too high. Therefore, the following equation allows for the automatic correction of irrigation times by the adjustment of the Irrigation Factor:

Irrigation Factor (New): $IFNEW=IF0+TF0/TF(-5)$

Where:
$IF_0$=Irrigation Factor at today
TF=Time Factor=3-day high temp average/3-day Irrigation Time average
$TF_0$=Time Factor at today
$TF_{(-5)}$=Time Factor five days ago If: $IF_0 = 3.33$
$TF_0 = 64.58$
$TF_{(-5)} = 60.42$
Then: $IF_{NEW} = 3.56$ Additionally, a minimum and maximum time per irrigation interval can be used to adjust the Irrigation Factor. For instance, if a minimum irrigation time per day of 20 hours is desired and a maximum irrigation time per day of 23 hours is also desired, then irrigation times can be calculated with the current Irrigation Factor and if the total irrigation times for all zones added together is not within the min/max range, the Irrigation Factor can be altered by the correct percentage to reach a min/max point.

The computerized nature of the entire system lends itself to a plethora of customization options. One example is the Varying Zonal Irrigation schedule: The SmartDrip™ controller can be set to select the zone with the highest automatic irrigation time to be the one that is irrigated first, the zone with the second highest automatic irrigation time to the irrigated second and so on until all zones have been irrigated.

In another example of a preferred embodiment, the system can vary irrigation by weather forecast. To do so an additional adjustment is made to the automatic irrigation time by allowing a modification based on multiplying the automatic irrigation time by a factor based on forecasted high temperature, the higher the forecasted high temperature, the greater the factor, the cooler the forecasted high temperature, the lesser the factor. The factor should be set to a minimum range of approximately 0.9 and a maximum range of 1.1. Also, the forecasted high temperature adjustment can be made on a three or five day forecast as well as a single day forecast.

Turning back to FIG. 1, once the central computer has correlated the collected data with the algorithms and parameters, the computer formulates a YES or NO decision whether to irrigate. This decision may be wirelessly transmitted to the grower via any known method of wireless transmission including cell phone text message, email, pager alert, SMS (short message service), MMS (multimedia message service) radio frequency, World Wide Web, mobile Web or others. The grower may then execute the decision by manually turning the irrigation system on or off or by logging onto the computer and remotely turning the irrigation system on or off. The grower may also choose to have his system automated so that the irrigation decision is transmitted to the base station 34 for execution. The field base station 34 is wired into the irrigation system 38 and can automatically start or stop the irrigation by opening or closing the valves in the specified zones. Simultaneously with the computer's transmission of a control command to the field based controller, the computer may also send an alert to the grower, advising of the irrigation change that has been made. The grower may choose to remotely override the change. The end user may request "quiet times" during which the computer does not send him alerts.

The central computer is capable of storing the data and acting as the web server 36 in such a manner that the data and outputs of the algorithms can be used for later viewing and further analysis by an end user.

The field base station 34 may also have settings so the grower can remotely instruct it to perform tasks such as adjust rates of water, activate the stop or start relay for an electric irrigation well, or activate solenoids to flush the filtration system.

The disclosed method and system enables the grower to assess and fully control his crops from the comfort of his office or the mobility of his cell phone.

A wide variety of data parameters may be programmed into the central computer as desired. For example, in one embodiment, when there is a significant amount of rainfall detected at the field, the central computer will send a signal to the field based controller to stop irrigation. Contemporaneously, the central computer will send a message to the end user, stating that a certain amount of rain has been measured and that the irrigation has been stopped. An end user will have the option to override the automatic signal sent to the field based controller if desired.

In another embodiment, the data collection devices will have the capability to collect data to help predict predicted environmental variables (weather changes). The algorithms will use the data to correlate how much water the plant needs to maintain its optimum growth, taking into account the plant's canopy temperature and the environmental and predicted environmental variables. For example, if the plant were somewhat thermal stressed, however, the system predicted low temperatures and a high chance for rainfall in the next twelve hours; it would be wasteful to run the irrigation system. The algorithms might generate the decision to delay irrigation under the circumstances.

Some growers may want the software to take note of commodities market changes and correlate those price ranges into the decision of whether to irrigate. Other growers may want to program certain critical life cycle stages, such as germination or blooming, of the plant's growth so that the computer takes these into account when making the irrigation decision.

There are certain times in a plant's life cycle where it may be beneficial for the plant to receive more or less water. For example, during germination, a plant may benefit from additional water. If the projected weather forecast includes rain, or even if it does not, it may be prudent to avoid watering, even if the plant exhibits stress. There are times when a grower may decide not to water, even if direct biological data reflects plant stress, due to changes in the market or changes in his projected crop income. All of these parameters and more can be programmed into the existing computer software to help tweak the irrigation decision depending on the grower's strategy.

In some states, there are periods of time when growers are not allowed to water, or are only allowed to water certain zones. Knowing which zones are in most need of water based on the plant type, plant life stage, and plant stress would help a grower to determine which zones to turn off when required to limit water usage. In conjunction with the collected biological and environmental data, a sound watering decision is reached. Some growers may want to monitor energy costs and correlate those numbers as additional criteria for determining whether to irrigate.

Another beneficial data measurement easily incorporated into this system is the pressures and flows of an irrigation system. In an embodiment, where the field base station is a transceiver, the controller may receive data from sensors capable of measuring pressure changes in the irrigation system. Changes in pressure outside specified parameters could trigger an alarm delivered from the field base station (via two way radio) to the central computer and from the central computer, wirelessly to the end user in the form of cell phone text message, email or other wireless means.

The hardware and software platform designed and used for the disclosed method and system are adaptable to many types of sensors, for example even analog sensors. The platform can define data from multiple types of sources. The benefit of this specially designed platform is that the operator need not change hardware or software in order to read new types of data. The platform has the ability to easily collect and interpret various types of known and unknown data. The system has an efficient protocol and can be run with very little memory. This in turn reduces cost.

The disclosed method, system and apparatus display a host of heretofore unknown advantages by giving the grower the ability to fully monitor and control his crop's condition from the comfort of his home, office or car and save water in the process.

The disclosed method and system is designed to be practical for application in agricultural irrigation. As it only includes field placed sensors and pods, a field based controller, and a programmed central computer, it is easy to set up in the field, inexpensive (representing a tiny fraction of a grower's expense of a drip irrigation system) and eliminates the need for the grower to make constant trips to the field. The grower can relax in the comfort of his home or office and know that his plant condition is being continually monitored and responded to. Stopping, starting or adjusting the irrigation is as easy as sending a text message. The grower rests assured that the computer's irrigation decisions are objectively based on sophisticated analysis of known plant parameters and algorithms, rather than on a grower's subjective visual assessment of the plant's status.

The real benefit lies in the economic and environmental savings garnered by more efficient use of water. The disclosed method and system has been tested in recent months by growers. One grower in particular, who is also the President of the Texas Alliance of Water Conservation, was quoted as saying the system saved him an average of two inches of water each year in his fields. This translates to significant financial savings, as well as a reduced environmental footprint and shows surprisingly effective results.

While the disclosed method and system has been described in conjunction with the preferred embodiments thereof, many changes, modifications, alterations and variations will be apparent to those skilled in the art. The invention should therefore not be limited to the particular preferred embodiment disclosed but should include all embodiments that could fall within the scope of the claims.

Accordingly, the preferred embodiments of the invention shown in the drawings and described in detail above are intended to be illustrative, not limiting, and various changes may be made without departing from the spirit and scope of the invention as defined by the claims set forth below.

The methods and systems disclosed and claimed herein can be made and executed without undue experimentation based on the level of disclosure presented. While the methods and systems have been described in terms of their preferred embodiments, it will be apparent to those skilled in the art that they are not limited to the exact steps described and may vary from such description without departing from the scope and spirit of the invention. The substitutes and modifications employed by one skilled in the art are deemed to fall within the scope of the invention.

What we claim is:

1. A method for remote analysis and automated correction of a crop's water needs, comprising:
   (a) capturing at least one crop characteristic from at least one crop sensor at specified time intervals, said crop sensor placed in the crop and having capability to transmit the captured crop characteristic to a field base station, wherein said at least one crop characteristic is selected from the group consisting of canopy temperature, leaf thickness, stem diameter, canopy color, and leaf wetness, wherein one of said at least one crop characteristics is canopy temperature, wherein the canopy temperature is measured by a crop sensor placed above the tops of the plant leaves;
   (b) capturing at least one weather characteristic from at least one sensor at specified time intervals, said sensor placed in the field or hardwired to the field base station and having capability to transmit the captured weather characteristic to a field base station, wherein said at least one weather characteristic is selected from the group consisting of rainfall, barometric pressure, ambient temperature, humidity, wind speed and solar radiation;
   (c) transmitting the crop characteristic to the field base station;
   (d) transmitting the weather characteristic to the field base station;
   (e) transmitting the crop characteristic and the weather characteristic from the field base station to a processor at specified time intervals, wherein said processor is programmed with: (1) known plant parameters, said plant parameters including values or formulas for calculating crop condition as correlated to levels of desired crop hydration, (2) one or more crop coefficients, wherein said crop coefficients are selected from the group consisting of plant stress time, canopy temperature minus optimum temperature, sensor input, soil moisture content, cost of water, crop price, water allocation remaining, predicted future high temperatures, desired yield percentage, desired margin percentage, market conditions, weather forecast and cost of energy, and (3) at least one algorithm capable of generating an irrigation decision by correlating the crop characteristic and the weather characteristic with the known plant parameters and at least one crop coefficient;
   (f) generating an irrigation decision using stored algorithms to correlate the crop characteristic and weather characteristic with the known plant parameters and at least one crop coefficient, wherein the stored algorithms additionally calculate plant water needs based on the plant species and stage of growth;
   (g) transmitting the irrigation decision to the field base station to execute at least one irrigation function.

2. The method of claim 1, wherein the method further comprises uploading one or more crop characteristics or irrigation decisions to a web host.

3. The method of claim 1, wherein the irrigation decision is also transmitted to an end user.

4. The method of claim 1, wherein the crop sensor transmits the crop characteristics to the field base station by radio signal.

5. The method of claim 1, wherein the processor is additionally programmed with location or soil conditions.

6. The method of claim 1, wherein the irrigation decision is transmitted via a wired communications network.

7. The method of claim 1, wherein the irrigation decision is transmitted via a wireless communications network.

8. The method of claim 1, wherein the irrigation function is selected from the group consisting of: starting one or more irrigation wells, stopping one or more irrigation wells, opening one or more irrigation valves, closing one or more irrigation valves, changing application rates and changing application timings.

9. The method of claim 1, wherein the at least one crop sensor comprises an infrared thermometer or dendrometer.

10. The method of claim 1, further comprising a method to monitor or control irrigation, comprising:
    (a) recording a water pressure in an irrigation system with at least one first sensor;
    (b) recording a flow rate in the irrigation system with at least one second sensor;

(c) transmitting the recorded water pressure and flow rate to said processor, wherein said processor is programmed with at least one algorithm capable of calculating a volume of output, wherein changes in said recorded water pressure can trigger an alarm that is delivered to an end user;

(d) recording time;

(e) calculating the volume of output; and (f) transmitting the volume of output to the field base station, web server or end user.

11. The method of claim 10, wherein the at least one algorithm additionally correlates the volume of output with a known parameter to generate an irrigation decision, and wherein said irrigation decision is transmitted to the field base station, web server or end user.

12. The method of claim 11, wherein the irrigation decision transmitted to the field base station initiates the execution of at least one irrigation function.

13. An agricultural irrigation controller, comprising:

(a) at least one sensor suitable for capture and transmission of one or more crop characteristics at specified time intervals, said sensor placed in the crop, wherein said one or more crop characteristic is selected from the group consisting of canopy temperature, leaf thickness, stem diameter, canopy color, and leaf wetness, wherein one of said one or more crop characteristics is canopy temperature, wherein the canopy temperature is measured by a crop sensor placed above the tops of the plant leaves;

(b) at least one sensor suitable for capture and transmission of one or more weather characteristics at specified time intervals, said sensor placed in the field or hardwired to the field base station, wherein said one or more weather characteristic is selected from the group consisting of rainfall, barometric pressure, ambient temperature, humidity, wind speed and solar radiation;

(b) a field base station capable of receiving crop characteristic and weather characteristic data from the sensors;

(c) a processor programmed with: (1) known plant parameters, said plant parameters including values and formulas for calculating crop condition as correlated to levels of desired crop hydration, (2) one or more coefficients, wherein said crop coefficients are selected from the group consisting of plant stress time, canopy temperature minus optimum temperature, sensor input, soil moisture content, cost of water, crop price, water allocation remaining, predicted future high temperatures, desired yield percentage, desired margin percentage, market conditions, weather forecast and cost of energy, and (3) at least one algorithm that correlates the captured one or more crop characteristics and the captured one or more weather characteristics with the known plant parameters and one or more crop coefficients to computer generate an irrigation decision, wherein the at least one algorithm additionally calculates plant water needs based on the plant species and stage of growth; and (d) a transmitter suitable for transmitting the irrigation decision from the processor to the field base station for execution by initiation of at least one irrigation function or to an end user.

14. The agricultural irrigation control of claim 13, further comprising a web host for hosting the data or irrigation decision.

15. The irrigation controller of claim 13, wherein the at least one crop sensor transmits the one or more crop characteristics to said field base station by radio signal.

16. The irrigation controller of claim 13, wherein the processor is additionally programmed with location or soil conditions.

17. The irrigation controller of claim 13, wherein said irrigation decision is transmitted via a wired communications network.

18. The irrigation controller of claim 13, wherein said irrigation decision is transmitted via a wireless communications network.

19. The irrigation controller of claim 13, wherein the irrigation function is selected from the group consisting of: starting one or more irrigation wells, stopping one or more irrigation wells, opening one or more irrigation valves, closing one or more irrigation valves, changing application rates and changing application timing.

20. The irrigation controller of claim 13, wherein the field base station is programmed to upload data to the processor at specified time intervals.

21. The irrigation controller of claim 13, wherein the at least one crop sensor comprises an infrared thermometer or dendrometer.

22. A hybrid method for controlling irrigation to an agricultural crop using the agricultural irrigation controller of claim 13, said hybrid method comprising splitting an irrigation time interval on a controller into a timer mode and an automatic mode, wherein the timer mode is a timed on and off irrigation schedule controlled by remote access from internet connection, and wherein in the automatic mode a processor uses at least one algorithm to correlate at least one collected crop characteristic with stored known plant parameters and at least one crop coefficient to generate and automatically execute an irrigation decision.

23. The method of claim 22, wherein the collected crop characteristic is selected from a group consisting of: canopy temperature, leaf thickness, stem diameter, canopy color, and leaf wetness.

24. The method of claim 22, wherein the processor uses the at least one algorithm to additionally correlate a collected weather characteristic with the at least one collected crop characteristic, the stored known plant parameters and the at least one crop coefficient to generate and automatically execute the irrigation decision.

25. The method of claim 24, wherein the collected weather characteristic is selected from the group consisting of: rainfall, barometric pressure, ambient temperature, humidity, wind speed and solar radiation.

26. The method of claim 22, wherein the crop coefficient is selected from the group consisting of: plant stress time, canopy temperature minus optimum temperature, sensor input, soil moisture content, cost of water, crop price, water allocation remaining, predicted future high temperatures, desired yield percentage, desired margin percentage, market conditions, weather forecast and cost of energy.

27. The irrigation controller of claim 13, further comprising an agricultural irrigation monitoring system, comprising:

(a) at least one sensor suitable to measure water pressure or flow rate in an irrigation system, wherein changes in said water pressure can trigger an alarm that is delivered to an end user;

(b) the processor further programmed with at least one algorithm capable of calculating a volume of output; and (c) the transmitter further suitable for transmitting the volume of output from the processor to the field base station, web server or end user.

* * * * *